(12) United States Patent
Hannum

(10) Patent No.: US 6,279,752 B1
(45) Date of Patent: Aug. 28, 2001

(54) WIDE RECTANGULAR CLARIFIERS

(75) Inventor: Joseph R. Hannum, Blue Bell, PA (US)

(73) Assignee: Polychem Corporation, Pheonixville, PA (US)

( * ) Notice: Subject to any disclaimer, the term of this patent is extended or adjusted under 35 U.S.C. 154(b) by 0 days.

(21) Appl. No.: 09/550,026

(22) Filed: Apr. 14, 2000

(51) Int. Cl.⁷ ...................................... B01D 21/20
(52) U.S. Cl. .................. 210/525; 210/526; 210/541; 198/728; 198/834; 474/164
(58) Field of Search .................. 210/525, 526, 210/541; 198/728, 834; 474/164

(56) References Cited

U.S. PATENT DOCUMENTS

| | | | |
|---|---|---|---|
| 2,965,217 | * 12/1960 | Dommann et al. | 198/834 |
| 3,685,367 | * 8/1972 | Dawson | 474/164 |
| 4,645,598 | 2/1987 | Hannum | 210/232 |
| 4,766,997 | 8/1988 | Hannum | 198/853 |
| 4,810,383 | 3/1989 | Hannum | 110/525 |
| 5,295,917 | 3/1994 | Hannum | 474/95 |
| 5,336,417 | 8/1994 | Hannum | 210/803 |
| 5,460,727 | * 10/1995 | Davis | 210/526 |
| 5,765,679 | * 6/1998 | Greive | 198/834 |
| 5,788,837 | * 8/1998 | Hannm | 210/526 |
| 5,806,658 | 9/1998 | Hannum | 198/731 |
| 5,992,644 | 11/1999 | Hannum | 210/525 |

* cited by examiner

Primary Examiner—Christopher Upton
(74) Attorney, Agent, or Firm—Harness, Dickey & Pierce, P.L.C.

(57) ABSTRACT

A waste water treatment system for removing sludge from within a rectangular clarifying tank having a plurality of sludge collector flights attached to a pair of parallel chains for collecting sludge and scum within the waste water. Each of the collector flights includes a non-metallic elongated main body portion having spaced top and bottom walls connected by spaced front and rear walls for defining a hollow, interior cavity. Buoyant foam material is disposed within the interior cavity for increasing the buoyancy of the collector flight. The waste water treatment system further includes plastic bull and drive sprockets mounted to a drive shaft running across the width of the tank, and a chain drive assembly for driving a pair of parallel drive chains attached to the drive sprockets. The drive assembly causes rotation of a drive shaft through a chain link attachment to the bull sprocket. The rotation of the drive shaft causes the rotation of the attached drive sprockets which, in turn, drive the parallel drive chains.

24 Claims, 14 Drawing Sheets

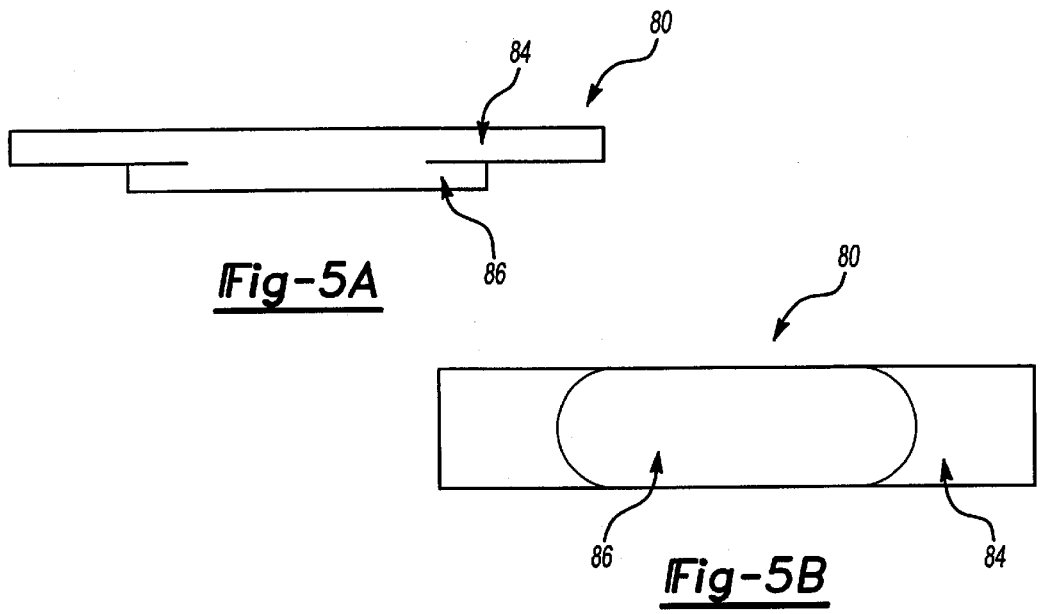
*Fig-5A*
*Fig-5B*
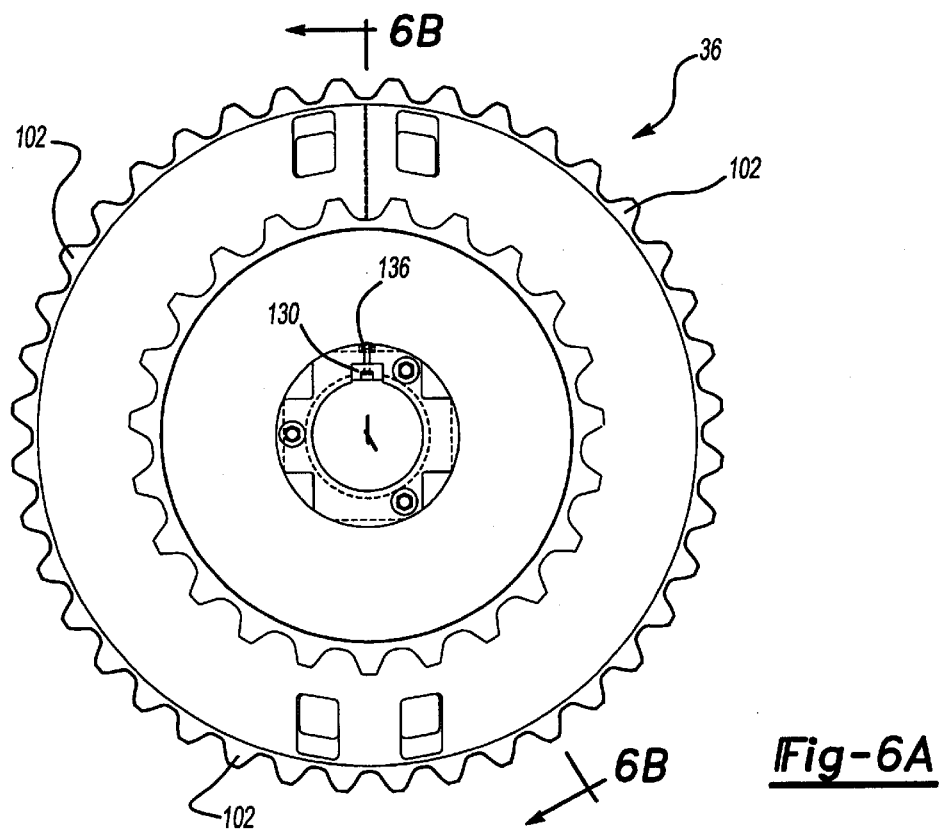
*Fig-6A*

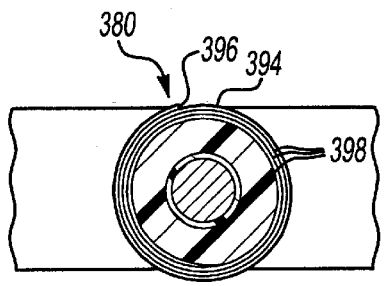
*Fig-22*
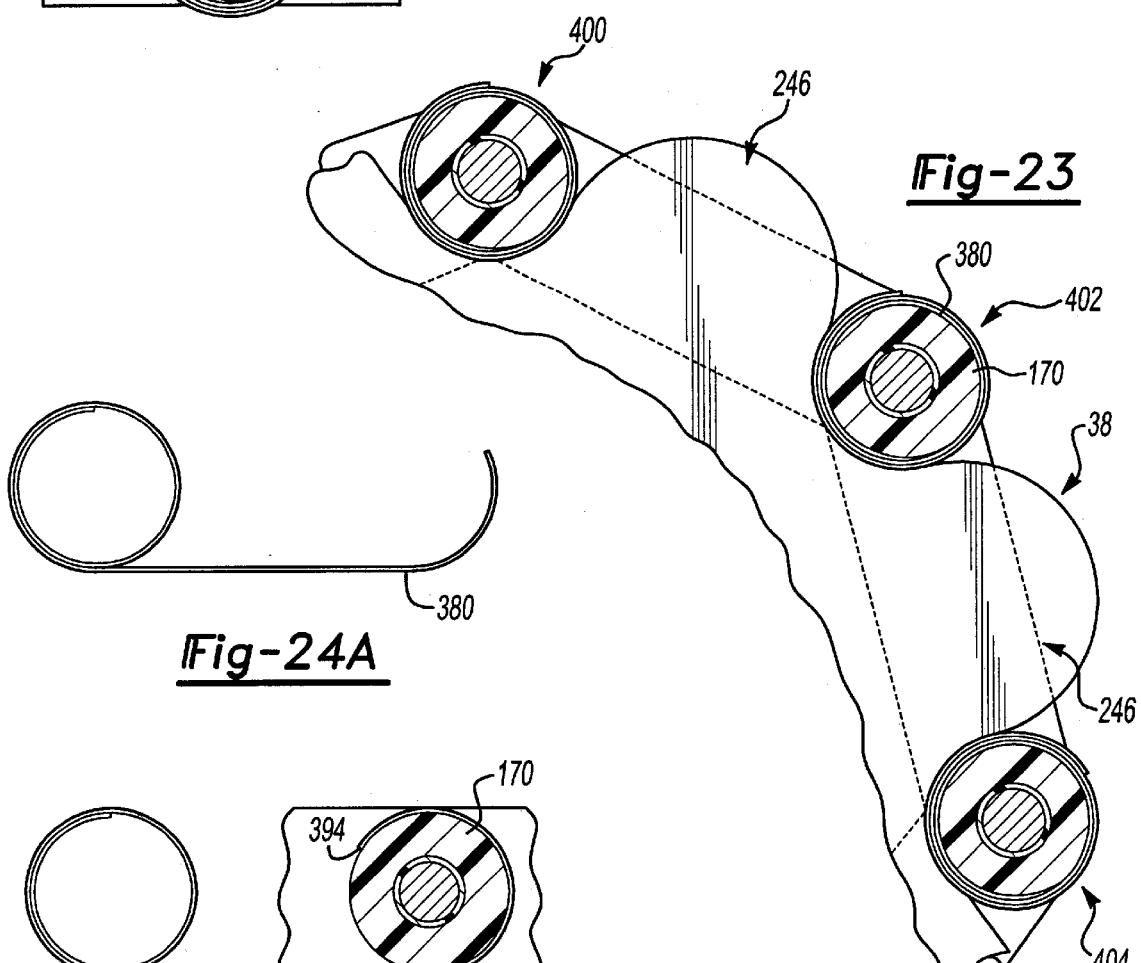
*Fig-23*
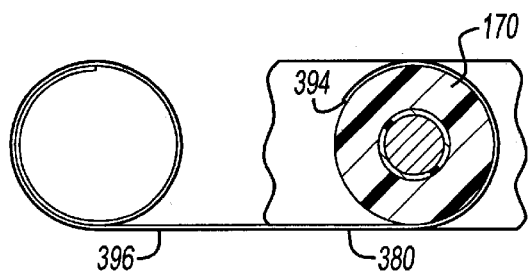
*Fig-24A*
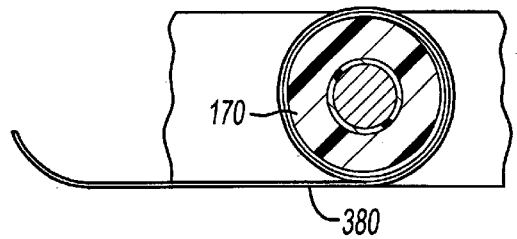
*Fig-24B*
*Fig-24C*

WIDE RECTANGULAR CLARIFIERS

BACKGROUND OF THE INVENTION

1. Technical Field

This invention relates to water treatment systems and, more particularly, to a waste water treatment system for use in a rectangular clarifying tank.

2. Discussion of Related Art

The use of a water treatment system including a series of scrapers or drag flights that are carried and driven by a pair of parallel conveyor chains throughout a rectangular clarifier, i.e. a rectangular concrete settling tank, is generally known in the art. Typically, the conveyor chains are driven by sprockets within the tank. Such a system is commonly employed for removing waste solids such as grit (i.e., non-biodegradable solids such as stones, sand, or glass), sludge and scum from the waste water in the tank. This type of waste water treatment system is commonly used in rectangular clarifying tanks having widths varying from 10 feet to 22 feet. Clarifying tanks of this size are typical for many applications in the United States. An example of such a system for tanks of this size is the waste water treatment system disclosed in U.S. Pat. No. 4,645,598 to Hannum, which is hereby incorporated by reference.

Generally, in operation, the series of flights move in one direction partially above the top surface of the waste water, pushing scum into a collector for its removal. Concurrently, other flights in the series move in an opposite direction along the bottom floor of the tank with the front faces of the flights collecting and gathering settled solid waste materials such as sludge. During this process, the flights may be subjected to heavy loads, commonly referred to as sludge loads. These loads are transferred to other components of the system including, but not limited to, the conveyor chains, sprockets and drive assembly. In order to reduce the loads on the system's components, most of the working parts are made from non-metallic material which is lightweight, minimizes wear between components, and has a high immunity to the corrosive environment within the clarifying tank.

Typically, as the width of a settling tank is increased, the flight or scraper length, as well as other hardware components, must be correspondingly increased or strengthened for the removal of additional waste solids. A problem associated with simply increasing the length of the flights is that the flights will be subjected to greater sludge loads, causing excessive center deflection of the flights. Such excessive deflection creates torsional loads as well as simultaneous twisting and bending of the flights. This can cause the flights, the flight attachment links and/or other components of the system to fail. Additionally, for many typical systems, as a tank is widened, the system's drive shaft, usually spanning the width of the tank, must also be lengthened. This may cause the drive shaft to deflect or bend due to an increase in its own weight.

In an attempt to overcome problems inherent with widening a settling tank, known waste water treatment systems have increased the mass of certain portions of the flights and associated hardware. This increase in mass typically increases the flight's strength, stiffness, and resistance to deflection. However, the increased mass of the flights and associated hardware may also create excessive loads that can cause failures of other components within the system. Furthermore, the metallic materials typically used in wide settling tank applications are exposed to the corrosive and degrading nature of the waste water. This combination of factors reduces the energy efficiency and durability of such steel systems, as well as increasing maintenance costs.

To overcome the above described deficiencies, dual drive shaft systems have been developed, wherein the drive motor and gearbox are positioned at the center point between the sides of the treatment tank. Equal length shafts extend laterally from the gearbox and each include a drive sprocket on its end to drive the chains of the water treatment system.

However, many existing water treatment facilities include a drive motor positioned at the side of the tank. It should be appreciated that retrofitting an existing wide-tank water treatment system with a dual drive shaft system may not be cost effective. Moreover, the simple replacement of corroded metal parts with additional metal parts may not maximize the useful life of the system.

It is therefore desirable to provide a water treatment system for use in a rectangular clarifying tank, having significant width, which offers reduced weight and wear, high immunity to corrosion and is driven from either the left or right hand side. Additionally, the drive shaft of such a water treatment system must overcome the deficiencies of significantly long drive shafts.

SUMMARY OF THE INVENTION

In accordance with the teachings of the present invention, a waste water treatment system for use in a settling tank is disclosed. The waste water treatment system of the present invention comprises a water treatment tank having opposing side walls, at least one water clarifier flight, first and second stub shafts and a drive shaft. The drive shaft further includes first and second end tubes; first, second and third drive sprockets; and an interconnecting tube having a bore. The interconnecting tube mates with the first and second end tubes for transferring rotational motion along the length of the drive shaft. The first and second stub shafts are rigidly connected to the side walls and the drive shaft is rotatably supported therebetween. Additionally, the first and second drive sprockets are fixed to the first and second drive shaft end tubes, and each of the first and second drive sprockets are coupled to opposite ends of the water clarifier flight for driving it. A motor is used to drive the third drive sprocket thus causing rotational motion of the drive shaft, thereby carrying the water clarifier flight through the tank.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The various advantages of the present invention will become apparent to those skilled in the art after reading the following specification and by reference to the drawings in which:

FIG. 5a is a side view, of a sprocket key;

FIG. 5b is a top view of the sprocket key;

FIG. 6a is a front view of a bull sprocket;

FIG. 22 is a cross sectional view, along line 22—22 of FIG. 21, of the conveyor chain;

FIG. 23 is a operational view of the conveyor chain; and

FIGS. 24a, 24b and 24c are operational views detailing assembly of a bearing band onto the conveyor chain.

DETAILED DESCRIPTION OF THE PREFERRED EMBODIMENTS

The following description of the preferred embodiments is merely exemplary in nature and is in no way intended to limit the invention, its application or uses. For example, the wide rectangular clarifier of the present invention may have utility in a wide variety of clarifying applications, such as the treatment of waste water, chemical baths, and the like.

The present invention is particularly concerned with providing a waste water treatment system for the removal of sludge and scum from a rectangular clarifier, i.e. a rectangular settling tank, partially filled with waste water. However, the present invention is not limited to the removal of sludge and scum but may be used in conjunction with other steps involved in the process of treating waste water such as, but not limited to, the removal of grit from a settling tank.

The system advantageously uses plastic components in order to minimize weight, wear, and corrosion in order to increase the system's energy efficiency and durability. In accordance with the present invention, the waste water treatment system will be described in conjunction with a settling tank having a width of greater than ten (10) meters, but the system is not limited to such an application and may be advantageously used in tanks with varying widths.

Figure 1:
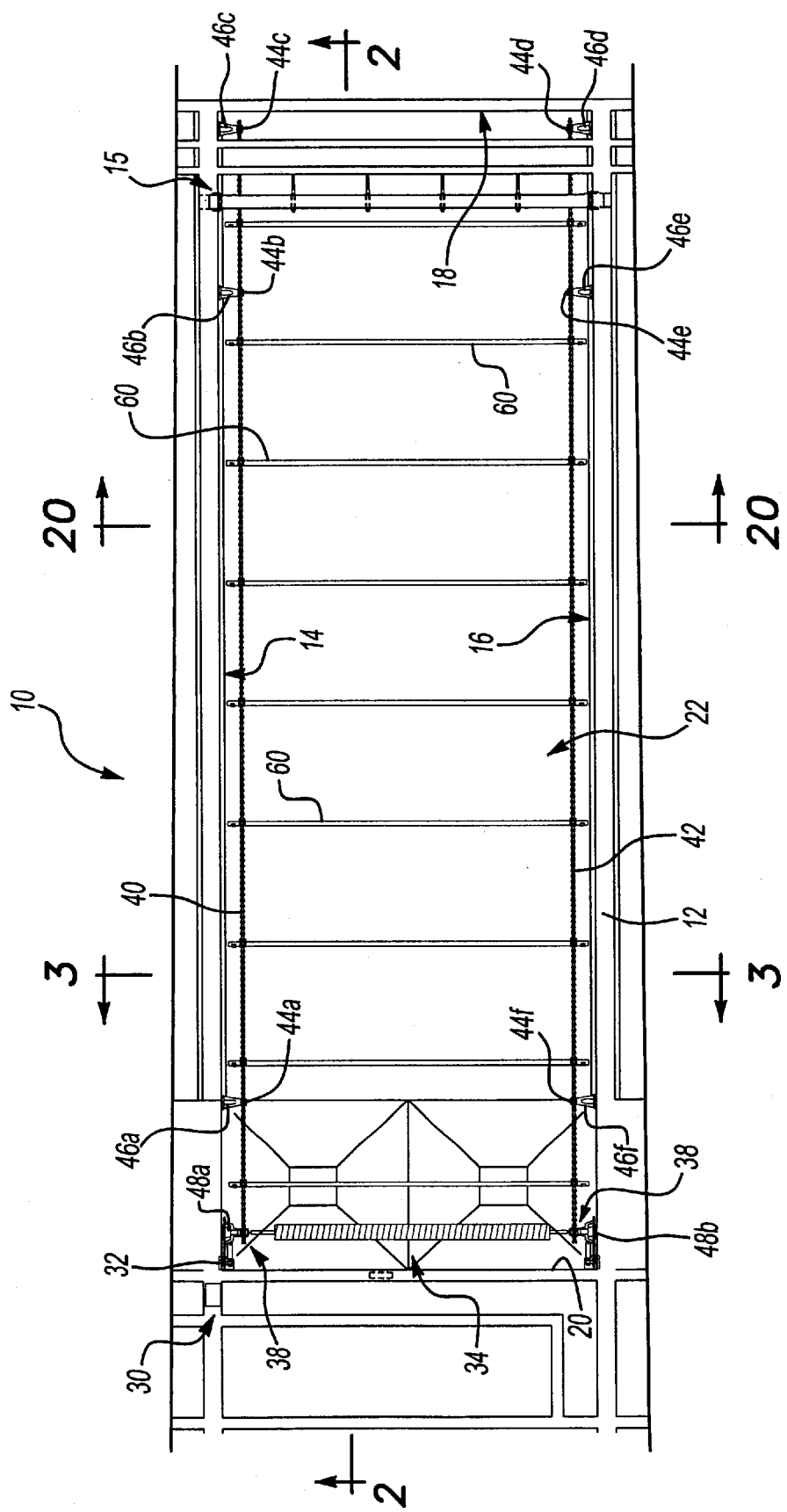
FIG. 1 is a plan view of a water clarifier tank and waste water treatment system according to the principles of the present invention.
Figure 2:
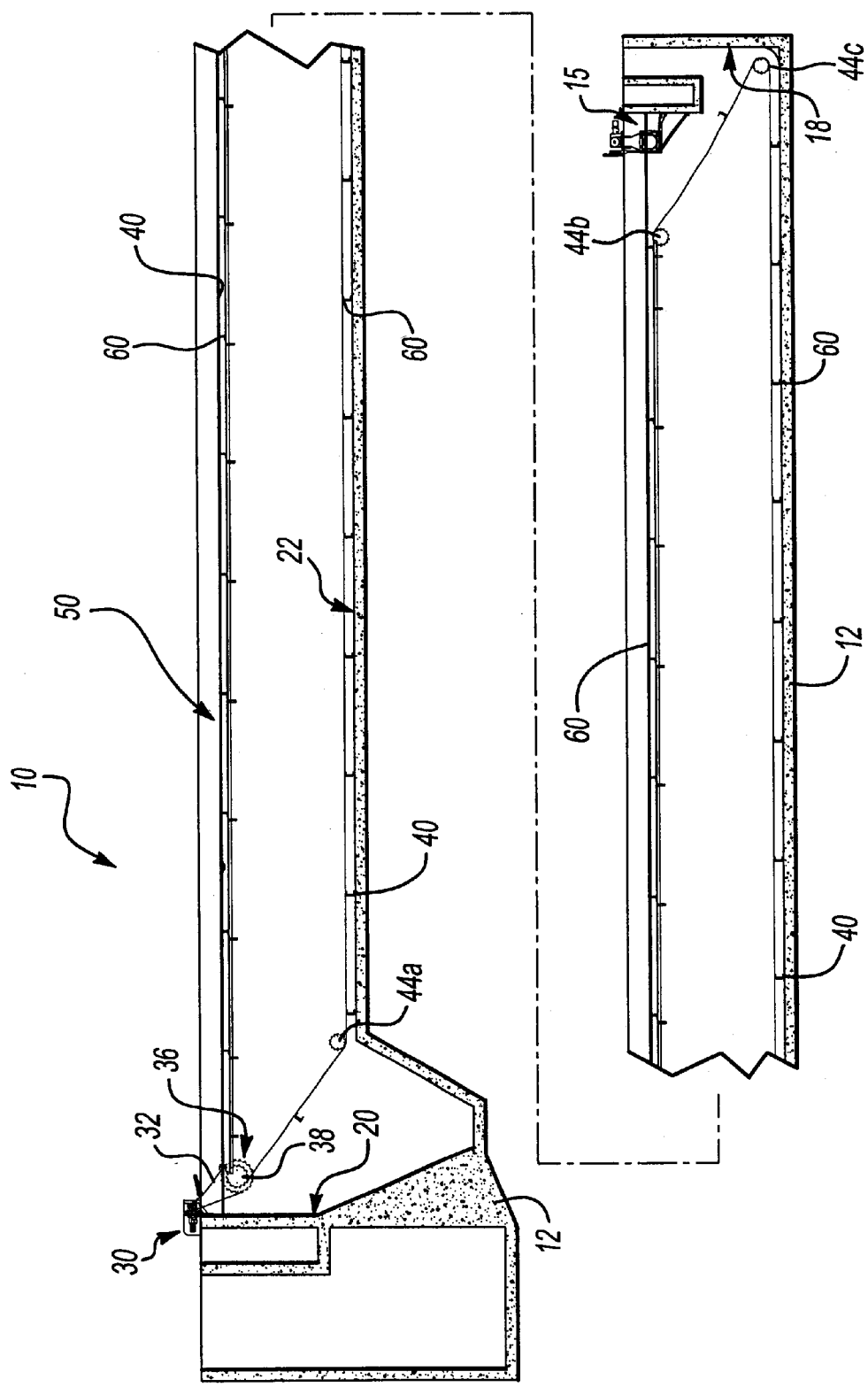
FIG. 2 is a cross sectional view, taken along line 2—2 of FIG. 1, of the water clarifier tank and waste water treatment system.

Referring to FIGS. 1 and 2, a waste water treatment system 10 including a rectangular settling tank 12 having a width of greater than ten (10) meters between side walls 14, 16 is shown. Tank 12 further includes end walls 18, 20 and a bottom surface 22. During operation, tank 12 is partially filled with waste water 50 for treatment. As best seen in FIG. 2, water treatment system 10 includes a motor 30 for driving a drive chain 32. Drive chain 32 in turn drives a bull sprocket 36 located on a drive shaft 34 within tank 12. When driven, bull sprocket 36 drives a pair of multi-piece drive sprockets 38 connected to drive shaft 34 at opposite ends. In turn, multi-piece drive sprockets 38 drive plastic conveyor chains 40, 42, which extend throughout the interior of tank 12. Conveyor chains 40, 42 are adapted for engaging plastic idler sprockets 44a, 44b, 44c, 44d, 44e, 44f. Each of the idler sprockets 44a–44f rotates freely on a corresponding stub post 46a, 46b, 46c, 46d, 46e, 46f. Stub posts 46a–46f are securely coupled to side walls 14, 16.

Conveyor chains 40, 42 rotate freely on idler sprockets 44a–44f. A series of sludge collector flights 60 are connected to conveyor chains 40, 42 and extend transversely across tank 12 for collecting sludge from bottom surface 22 and for skimming the top surface of the waste water for collecting scum. In turn, the scum is collected by a scum pipe assembly 15. As will be described in detail below, flights 60 are buoyant such that each flight 60 has a specific gravity of approximately one (1). This reduces the loads on the other components of system 10 such as, but not limited to, conveyor chains 40, 42, idler sprockets 44a–44f, and multi-piece drive sprockets 38. The term buoyant, as used herein, refers to the magnitude of the buoyant force, equal to the weight of the volume of waste water displaced by the flight 60, opposing the weight of flight 60. The term neutrally buoyant refers to when the buoyant force equals the weight of flight 60. Also, as flight 60 collects sludge and scum throughout tank 12, any center deflection of flight 60 is minimized allowing flight 60 to experience maximum sludge loads for a given size tank.

Figure 3:
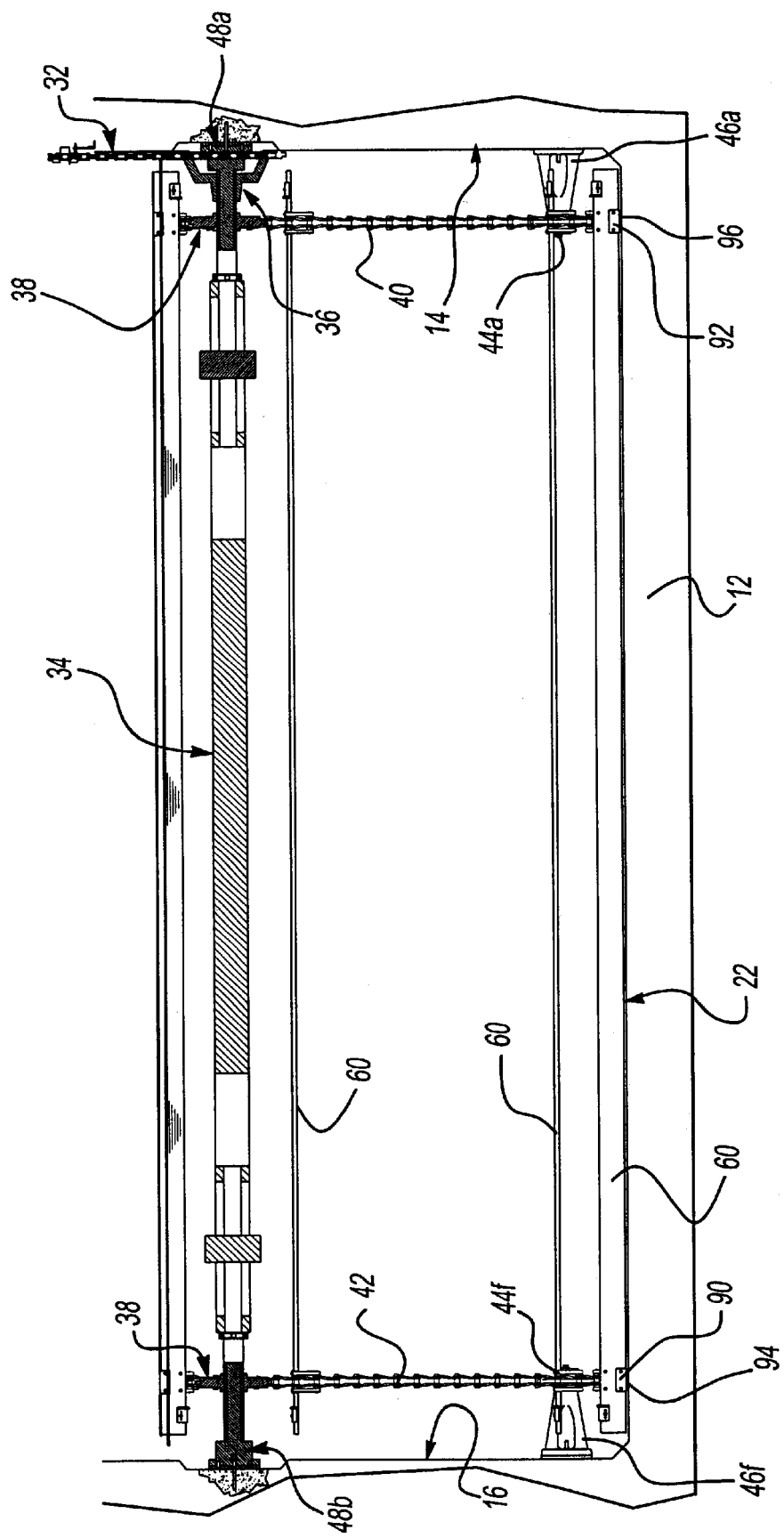
FIG. 3 is a cross sectional view, taken along line 3—3 of FIG. 1, of a single drive shaft, collector flights and chain drive assembly.

Turning to FIG. 3, drive chain 32 is shown operably engaging bull sprocket 36, thereby driving multi-piece drive sprockets 38. Axially aligned drive shaft 34 extends across the width of tank 12 as defined by side walls 14, 16. As described earlier, motor 30 (FIGS. 1 and 2) is coupled to drive chain 32.

With further reference to FIG. 3, multi-piece drive sprockets 38 drive conveyor chains 40, 42 as well as flight 60. Flight 60 includes plastic wear shoes 90, 92 which ride on bottom wear plates or tracks 94, 96. Bottom wear plates 94, 96 are fixed to bottom surface 22 of tank 12.

Figure 4A:
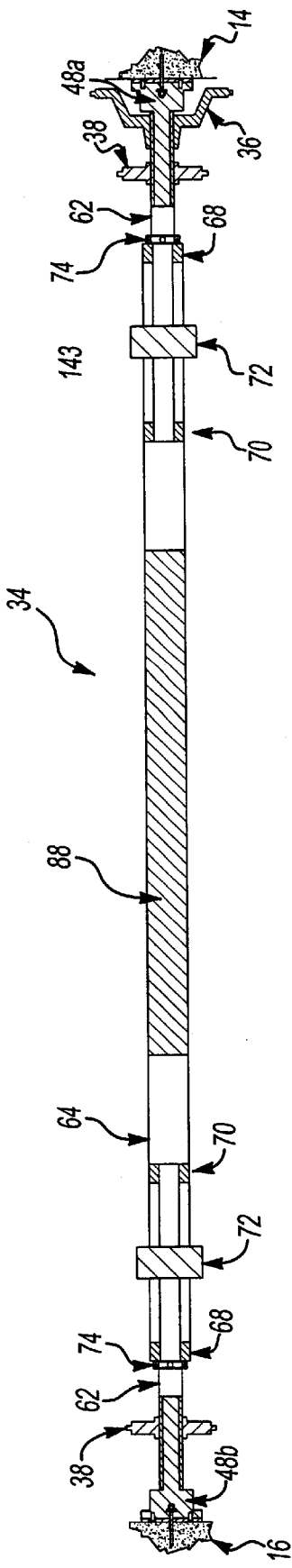
FIG. 4a is a cross sectional view of the single drive shaft.
Figure 4B:
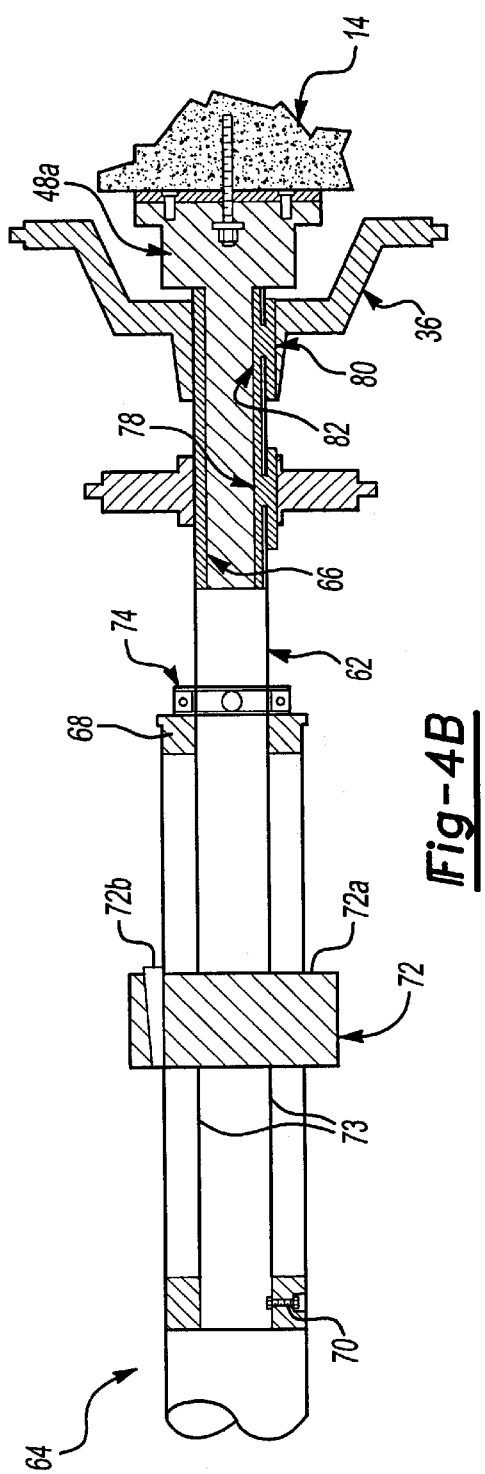
FIG. 4b is an enlarged view of a first end of the drive shaft.

With reference to FIGS. 4a and 4b, drive shaft 34 will now be described in detail. It should be appreciated that first and second ends of driveshaft 34 are comprised of like components. As such, like reference numerals will signify components of both sides and only one side will be described in detail.

Drive shaft 34 is comprised of various non-metallic components. Materials including nylon, celeron and fiberglass are used to produce the corrosion resistant drive shaft 34. Drive shaft 34 is rotatably supported between sides 14, 16 of tank 12 by a pair of stub shafts 48a, 48b. Each stub shaft 48a, 48b is formed of a base, which is screwably attached to side walls 14, 16, and a cylindrically shaped extension, protruding a length from the base. The interface between each stub shaft 48a, 48b and its respective side wall 14, 16 is such that screws can be used to adjust either stub shaft 48a, 48b to insure that they are properly aligned. Stub shafts 48a, 48b must be properly aligned about a common axis to allow for uninhibited rotation of drive shaft 34, supported therebetween. Interfaced with each stub shaft 48a, 48b is an end tube 62. End tube 62 comprises a length of tube, having an outer diameter and a wall thickness, so as to define a hollow cavity. An integrated bearing 66 is disposed within the hollow cavity, at one end of end tube 62. Integrated bearing 66 is preferably made from a nylon material and is press fit into end tube 62. Integrated bearing 66 has a length which is generally equivalent to the length of the cylindrical extension of stub shafts 48a, 48b.

End tube 62 has multi-piece drive sprocket 38 attached thereto. Bull sprocket 36 must be mounted to either the right or left end tube 62. Dependant upon the configuration of tank 12, either the left or right hand side end tube 62 can have bull sprocket 36 attached thereto. For illustrative purposes only, it will be assumed that the configuration of tank 12 requires bull sprocket 36 to be mounted to right side end tube 62 of drive shaft 34. With particular reference to FIG. 4b, right side end tube 62 maintains a generally oval shaped sprocket key notch 82 through integrated bearing 66. A sprocket key 80 functions as an interface between bull sprocket 36 and end tube 62. As such, bull sprocket 36 is not freely rotatable on end tube 62.

With reference to FIGS. 5a and 5b, bull sprocket key 80 has an upper rectangular portion 84 and a lower oval portion 86. Sprocket key notch 82 is shaped such that it receives lower oval portion 86 of sprocket key 80. Lower oval portion 86 is of sufficient depth to maintain an interface with sprocket key notch 82. Additionally, lower oval portion 86 is not too high, so as to contact internally disposed stub shaft 48a, 48b. Once lower oval portion 86 of sprocket key 80 has been received into sprocket key notch 82, upper rectangular portion 84 forms a stepped region, rising above an outside surface of end tube 62. Upper rectangular portion 84 is then received into bull sprocket 36.

Figure 6B:
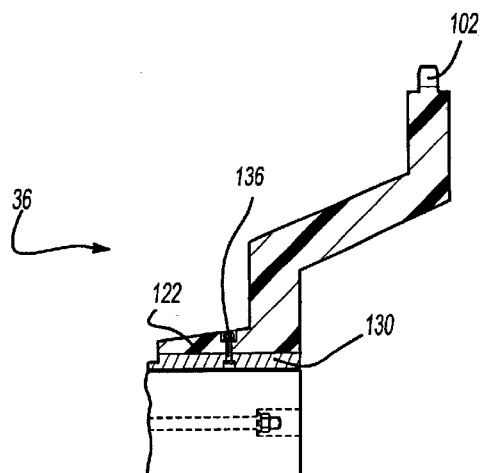
FIG. 6b is a cross sectional view, taken along line 6b—6b of FIG. 6a, of the bull sprocket.

Turning now to FIGS. 6a and 6b, details of bull sprocket 36 are shown. Bull sprocket 36 is preferably plastic, having radially extending teeth 102. Preferably, bull sprocket 36 has a pitch of 2.609 inches. A sprocket keyway 130 extends throughout a hub portion 122 of sprocket 36. Sprocket keyway 130 receives upper rectangular portion 84 of sprocket key 80. A stainless steel bolt 136 extends through hub portion 122 for securing sprocket key 80 within sprocket keyway 130.

In assembling bull sprocket 36 to end tube 62, sprocket key 80 must first be in place in sprocket key notch 82. Sprocket 36 is then slid onto the outside diameter of end tube 62 and slid along a length until bull sprocket 36 interfaces with sprocket key 80. Sprocket keyway 130 must be aligned with upper rectangular portion 84 of sprocket key 80 in order for the components to properly interface. Sprocket key 80 prohibits free rotation of bull sprocket 36 about end tube 62. Therefore, as bull sprocket 36 is caused to rotate, end tube 62 is also caused to rotate. Since tank 12 of the preferred embodiment only drives one side of drive shaft 34, bull sprocket 36, is only required for one side.

With further reference to FIG. 4b, multi-piece drive sprocket 38 interfaces with end tube 62 similarly as described for bull sprocket 36. Accordingly, end tube 62 has a sprocket key notch 78 through its outside diameter. Again, sprocket key 80 is used to interface multi-piece drive sprocket 38 and end tube 62. As such, multi-piece drive sprocket 38 is not freely rotatable about end tube 62.

Figure 7:
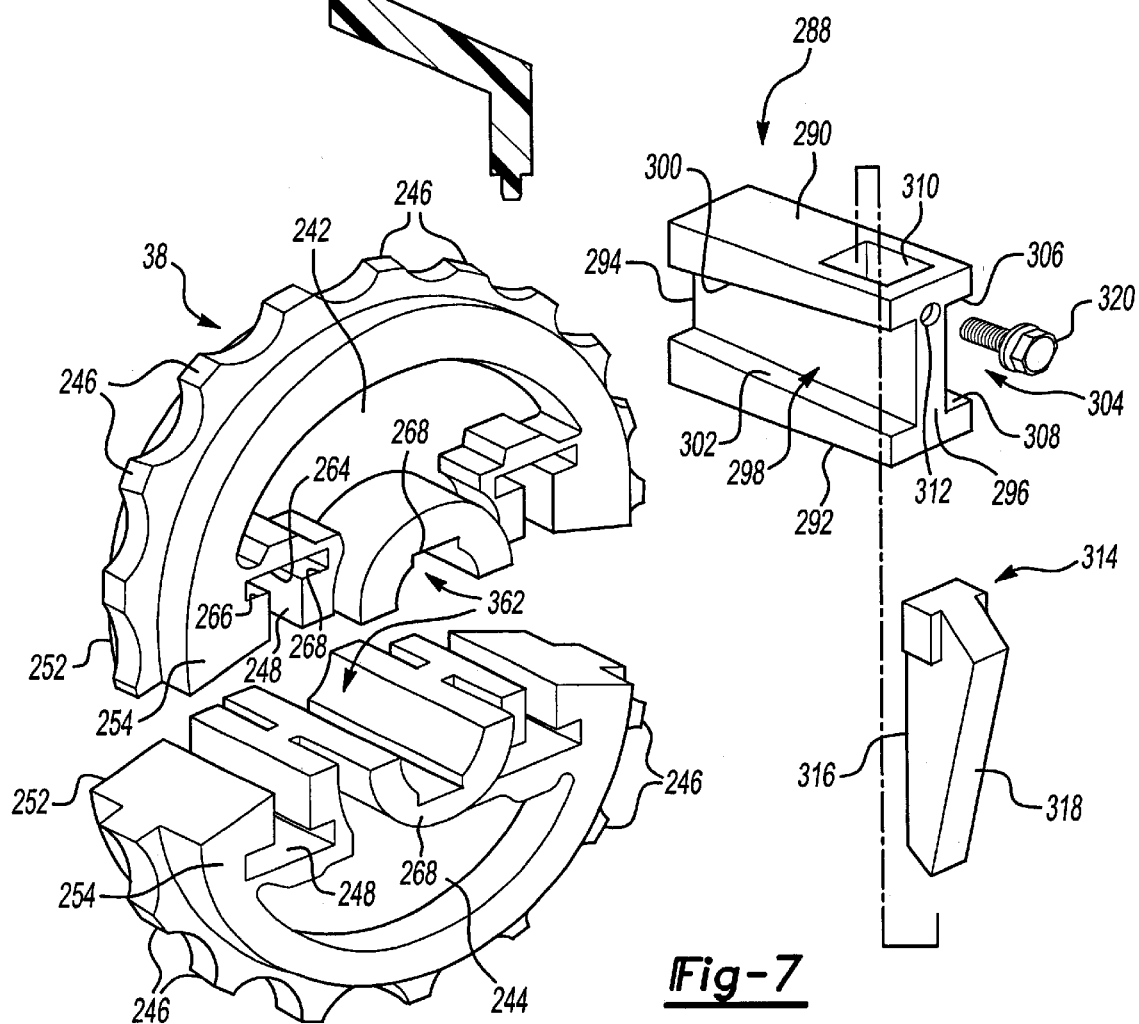
FIG. 7 is an exploded perspective view of a multi-piece drive sprocket.
Figure 8:
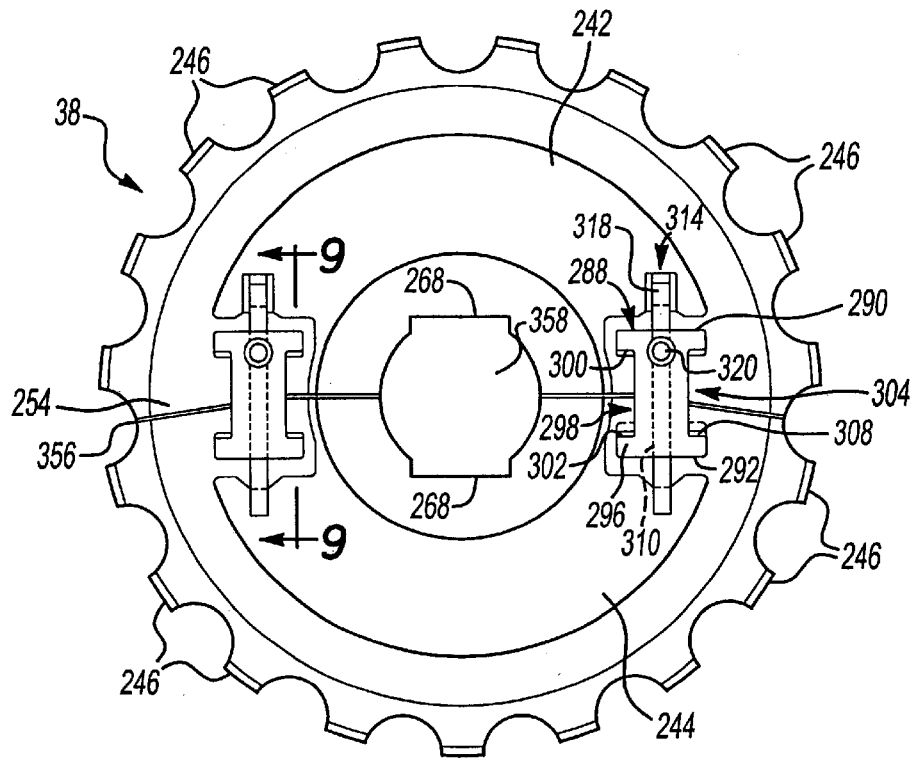
FIG. 8 is a front view of the multi-piece drive sprocket.

With reference to FIGS. 7 and 8, multi-piece drive sprocket 38 will be described in detail. Preferably, the below described components of multi-piece drive sprocket 38 are made of non-metallic material, such as plastic, or cast NYLON 6, although they could be made from other rigid materials. Multi-piece drive sprocket 38 includes a pair of semi-circular sprocket members 242, 244 each having radially extending teeth 246 for engaging conveyor chains 40, 42. It will be appreciated that semi-circular sprocket members 242, 244 are identical. This provides a cost benefit during manufacture of semi-circular sprocket members 242, 244, as a single die is required.

Each semi-circular sprocket member 242, 244 has first and second identical openings 248 extending from major face 252 to major face 254. Openings 248 are positioned such that as semi-circular sprocket members 242, 244 are brought together opening 248 mates with an opposing opening 248. Each opening 248 includes flat surface 264, extending perpendicular to major faces 252, 254. Opening 248 also includes tapered surfaces 266, 268 tapering from major face 252 to major face 254.

With continued reference to FIGS. 7 and 8, a wedge member 288 includes a flat top surface 290, which is parallel to flat bottom surface 292, and perpendicular to flat end surfaces 294, 296. Preferably, wedge member 288 includes flat side recess 298 defined by tapered edges 300, 302 which taper in opposite directions from end surface 294 to end surface 296. Similarly, flat side recess 304 is defined by tapered edges 306, 308 also tapering in opposite directions from end surface 294 to end surface 296. Aperture 310 extends from flat top surface 290 through to flat bottom surface 292 for receiving key member 314. Threaded aperture 312 extends from end surface 296 through to aperture 310 for receiving set screw 320. Key member 314, including level surface 316 and inclined surface 318, is shaped such that it is capable of being efficiently inserted and removed from aperture 310. It is appreciated that two wedge members 288 are required for assembly of split sprocket wheel 240. Additionally, it should be noted that the directions and degrees of tapering of the tapered surfaces and edges are used by way of example, and other degrees of tapering in different directions are possible.

Figure 9:
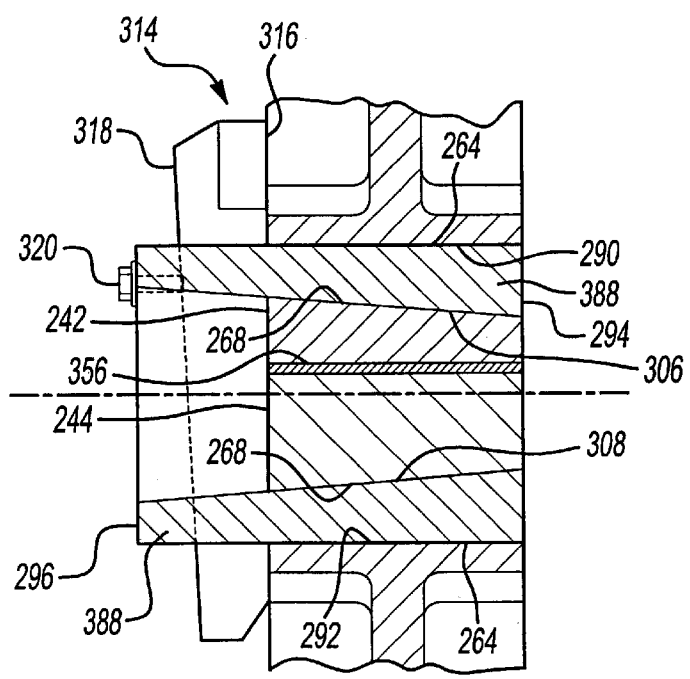
FIG. 9 is a cross sectional view, taken along line 9—9 of FIG. 8, of the multipiece drive sprocket.

Referencing FIG. 9, a cross sectional view along line 9—9 of FIG. 8 of multipiece drive sprocket 38, is illustrated. Wedge member 288 is in a locked position such that a split line 356 is maintained between sprocket members 242, 244. By inserting wedge member 288 into openings 248, from major face 252 towards major face 254, sprocket members 242, 244 are urged towards one another. During insertion, split line 356 is formed when flat top surfaces 290, 292 engages flat surfaces 264.

With further reference to FIG. 9, during insertion, tapered surface 268 engages tapered edge 306 and identical and opposing tapered surface 268 engages tapered edge 308. Simultaneously (but not shown), tapered surface 266 engages tapered edge 300 and identical and opposing tapered surface 266 engages tapered edge 302. Movement between sprocket members 242, 244 stops, prior to contact, when flat surfaces 290, 292 engages flat surfaces 264.

Once wedge member 288 is partially inserted between sprocket members 242, 244 key member 314 is inserted within aperture 310 from flat top surface 290 towards flat bottom surface 292. Inclined surface 318 pushes against and wedges wedge member 288 within openings 248. Level surface 316 abuts major faces 254. This aligns and prevents tilting movements between sprocket members 242, 244.

Finally, when key member 314 is fully disposed within aperture 310, set screw 320 is disposed within threaded aperture 312 and pushes against key member 314, thereby holding key member 314 within aperture 31.

Again referencing FIGS. 7 and 8, sprockets 242, 244 each have semicircular recesses 362. When sprocket members 242, 244 are brought together, the semi-circular recesses 362 form hole 358 for mounting split sprocket wheel 240 onto end tubes 62. Additionally, semi-circular recess 362 has a keyway 268. The width of keyway 268 is equivalent to the width of rectangular upper portion 84 of drive sprocket key 80. Keyway 268 tightly receives rectangular upper portion 84. Once assembly has been complete, multi-piece drive sprocket 38 is fixed to end tube 62, such that it is not free to rotate.

Figure 10:
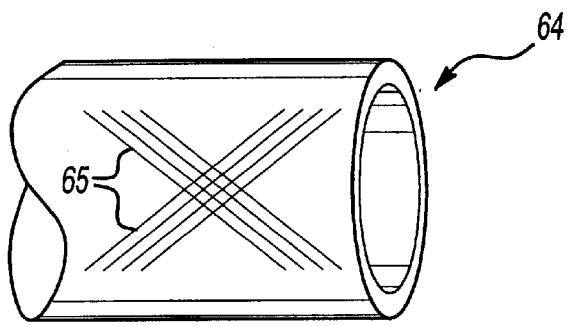
FIG. 10 is a schematic view of a portion of an interconnecting tube.

Again referencing FIG. 4a, an interconnecting tube 64 is used to bridge left and right side end tubes 62. Interconnecting tube 64 is preferably constructed from biaxially wrapped fiberglass 65 at an angle greater than 35°. This is best seen in FIG. 10. Such a wrapping angle offers maximum torque strength with minimal amount of tube deflection. It is apparent to one skilled in the art that this is a preferred construction of interconnecting tube 64 but does not limit interconnecting tube 64 from being constructed of other materials or having angles other than 35°. Interconnecting tube 64 has an outside diameter and a wall thickness and is hollow along its length. Additionally, interconnecting tube 64 is partially filled with a buoyant material 88, such as, but not limited to, foam. As such, interconnecting tube 64 is buoyant, thus reducing any sag which may result from significant length.

Figure 11A:
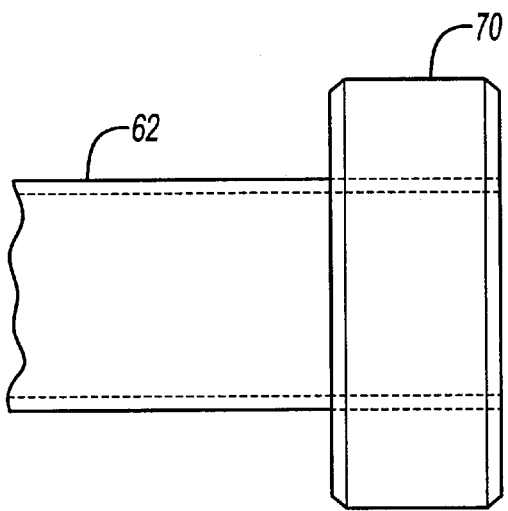
FIG. 11a is a side view, of a spacer ring.
Figure 11B:
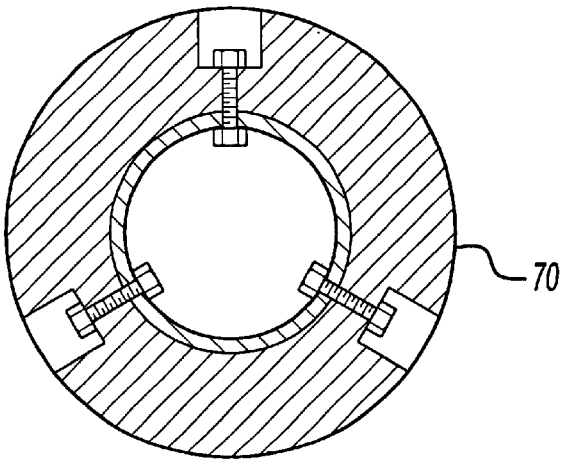
FIG. 11b is a front view of the spacer ring.

Spacer rings 70 serve to align interconnecting tube 64 axially between end tubes 62. Spacer rings 70 are detailed in FIGS. 11a and 11b. Spacer rings 70 are generally of a donut shape, having outside and inside diameters. Additionally, three holes are bored through each spacer ring 70 and are equilaterally disposed around. The holes allow for screwable attachment of spacer rings 70 to end tubes 62. Spacer rings 70 are mounted to the end of end tubes 62 and screwably attached, each using three bolts.

Figure 12A:
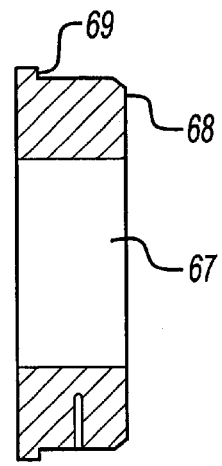
FIG. 12a is a side cross sectional view of an end cap.
Figure 12B:
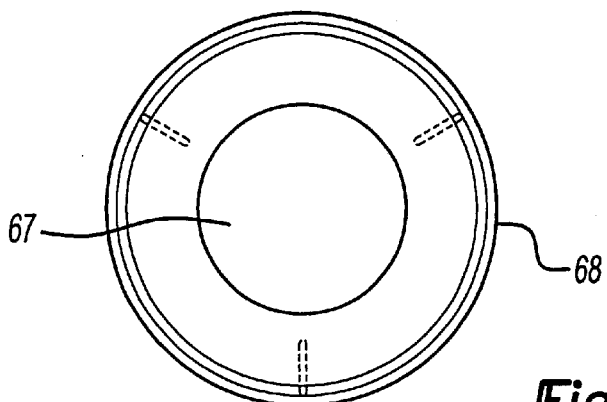
FIG. 12b is a front view of the end cap.

End caps 68 also axially align interconnecting tube 64 between end tubes 62. End caps 68 are detailed in FIGS. 12a and 12b. End caps 68 also cover the ends of interconnecting tube 64. Prior to assembling spacer rings 70 to end tubes 62, end caps 68 for interconnecting tube 64 must be slid onto end tubes 62. Once slid onto end tubes 62, end caps 68 are free to slide axially along the length of end tube 62 as they are not rigidly fixed thereto. Each end cap 68 maintains a small step 69. Step 69 prevents end caps 68 from being fully inserted into interconnecting tube 64. End caps 68 have a hole 67 bored through a center axis allowing for insertion of end tubes 62 therethrough.

Figure 13:
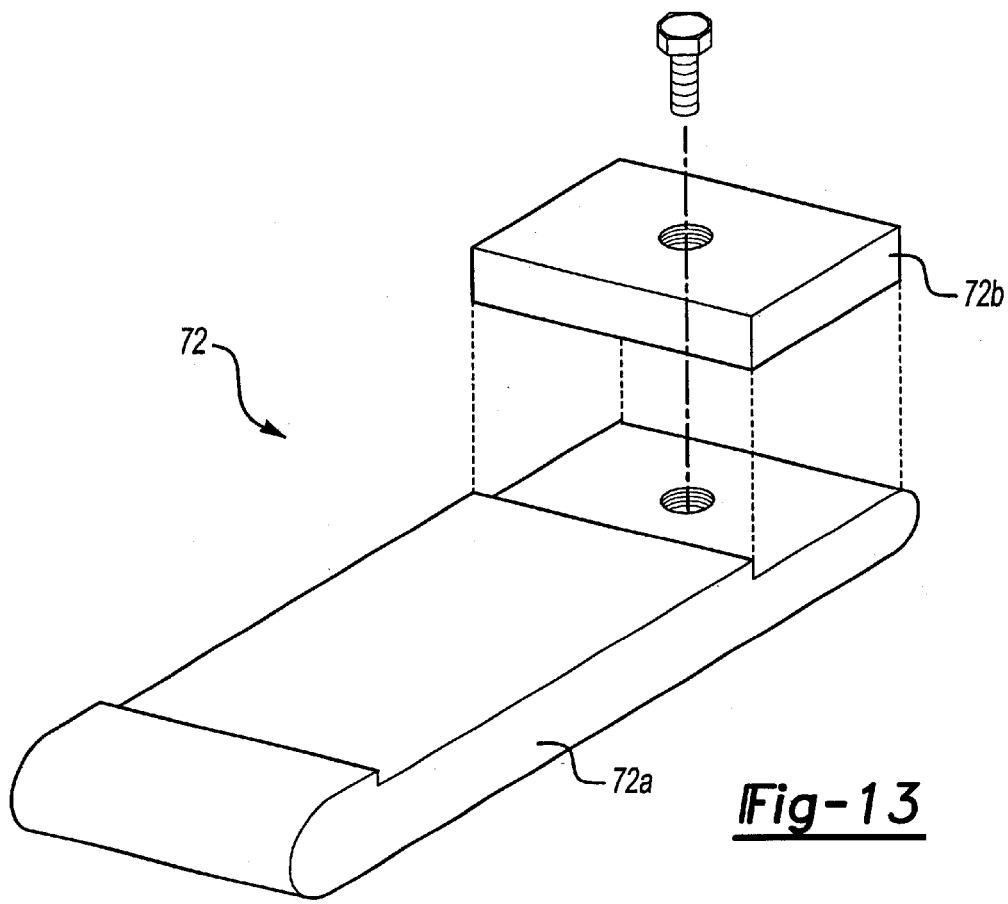
FIG. 13 is an exploded schematic view of a key.

With further reference to FIGS. 4a and 4b, interconnecting tube 64 must be rotationally fixed, such that interconnecting tube 64 is not free to rotate relative to end tubes 62. To achieve this, a key 72 runs completely through interconnecting tube 64, passing through end tube 62. Slots 73 are cut through end tubes 62 enabling key 72 to pass therethrough. With particular reference to FIG. 13, keys 73 comprise a main key body 73a and an attachable locking body 73b. Main key body 73a is first passed through interconnecting tube 64. Locking body 73b is then fixedly attached to main key body 73a, such that key 73 is prohibited from passing back through interconnecting tube 64 and end tube 62. Being rotationally fixed, relative to end tubes 62, interconnecting tube 64 acts to transfer rotational motion and torque between end tubes 62.

Figure 14:
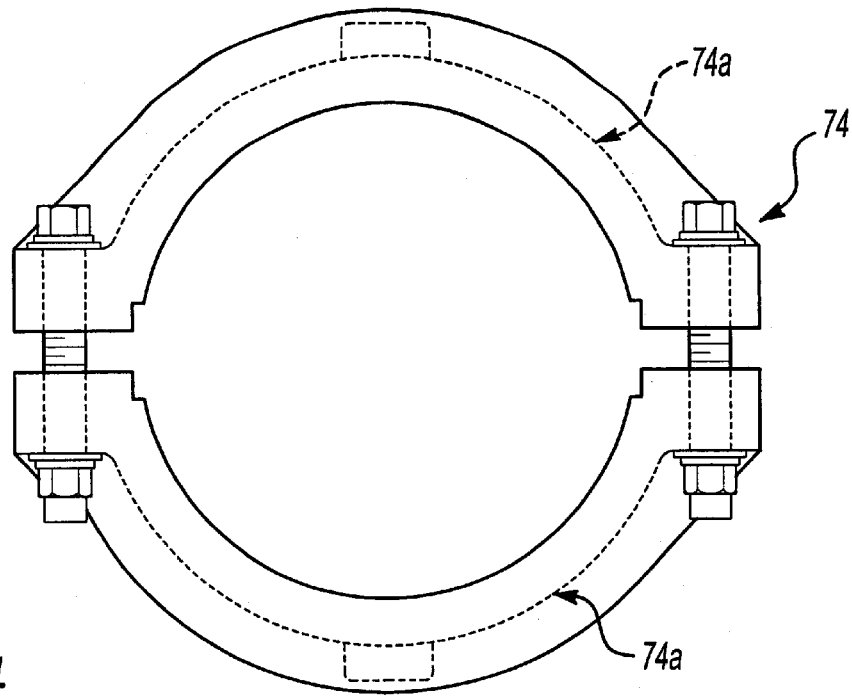
FIG. 14 is a front view of a retaining ring.

Again referencing FIGS. 4a and 4b, retaining collars 74 are fixed about the outside diameter of end tubes 62 and are located between multi-piece drive sprockets 38 and interconnecting tube 64. As best shown in FIG. 14, retaining collars 74 comprise two identical semi-circular portions 74a which are screwably attached. Retaining collars 74 act to hold interconnecting tube 64 in place, preventing it from sliding axially. Retaining collars 74 maintain the position of interconnecting tube 64, such that it is centered between end tubes 62.

Figure 15:
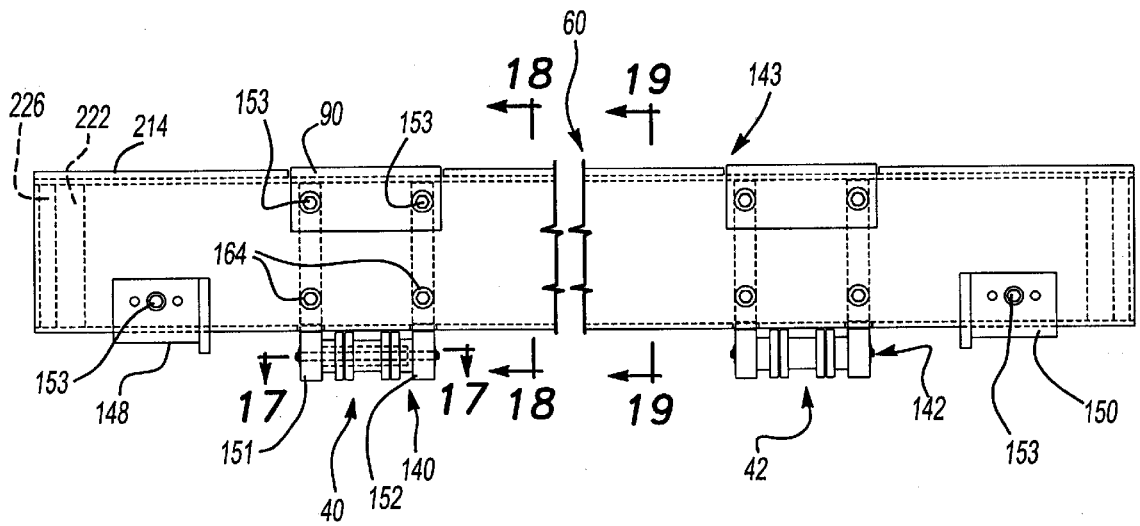
FIG. 15 is a front view of a sludge collector flight.

As described earlier drive shaft 34 acts to transfer rotational motion along its length, driving multi-piece drive sprockets 38. In turn, parallel plastic conveyor chains 40, 42 are driven, rotating sludge collector flights 60 through settling tank 12. Flight 60, illustrated in FIG. 15, is representative of the other flights in the series. Flight 60 includes a non-metallic elongated main body portion 143 which is attached to conveyor chains 40, 42 via a pair of non-metallic flight attachment assemblies 140, 142. Plastic wear shoes 90, 92, 148, 150 are attached to flight 60 for purposes of reducing wear and facilitating travel of flight 60. Each of wear shoes 90, 92, 148, 150 are attached to flight 60 with stainless stain nut and bolt assemblies 153 extending through main body portion 143.

Figure 21:
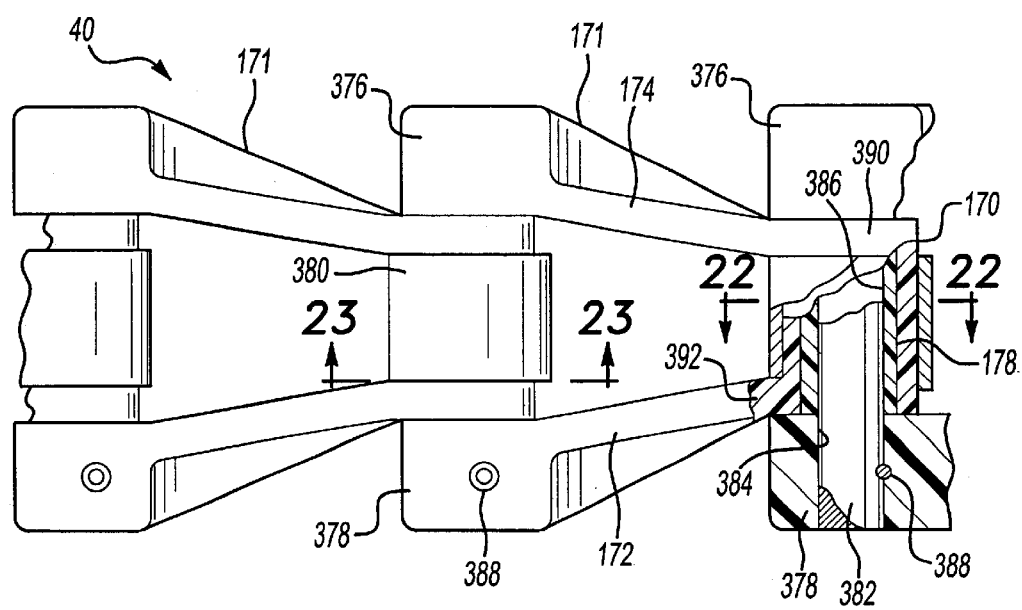
FIG. 21 is a detailed view of a conveyor chain.

Conveyor chains 40, 42 are of identical construction. Therefore, only conveyor chain 40 will be described in detail. A section of conveyor chain 40 is illustrated in FIGS. 21 and 22. Conveyor chain 40 includes a plurality of side bars 172, 174. Side bars 172, 174 may be made of NYLON 6 or other suitable plastic material. Side bars 172, 174 are connected by a barrel portion 170, which is circular in shape. Barrel portion 170 and bars 172, 174 thus form a chain link 171. A pair of end projecting portions 376, 378 are located at the ends of side bars 172, 174, respectively. A removable preformed coiled band 380 is wrapped around and dimensioned to tightly engage barrel portion 170 to provide a bearing for side bars 172, 174.

A connecting pin 382 is inserted through apertures 384 in portions 376, 378. Only one of apertures 384 is illustrated in FIG. 21. Barrel portion 170 also includes a central aperture 386. When pin 382 is inserted through apertures 384, 386, adjacent links are held together by a screw 388 which fixes pin 382 in place. With pin 382 in place, side links 171 are free to pivotally move with respect to each other during movement of conveyor chain 40.

As illustrated in FIG. 22, coiled band 380 comprises a pair of free ends 394, 396. This permits coiled band 380 to be manually uncoiled to permit installation on barrel portion 170. When one of ends 394, 396 of coiled band 380 is inserted around barrel portion 170, band 380 is uncoiled manually with end 394, 396 separated from the main body of band 380 to start wrapping around barrel portion 170. Once started, coiled band 380 is rotated until it is wrapped around barrel portion 170 relatively tight. These steps are illustrated in FIGS. 24a, 24b and 24c.

The coils of band 380 may be manually uncoiled (FIG. 24a) with end 394 being wrapped around barrel portion 170 (FIG. 24b). A continued wrapping of the coils of band 380 around barrel portion 170, moves end 394 further around barrel portion 170 and causes the inner coils to be held on barrel portion 170. The coils of band 380 may then be rolled on barrel portion 170 (FIG. 24c). Finally, band 380 is completely wrapped around barrel 170, as illustrated in FIG. 22. Band 380 may be installed manually or with the use of suitable tools.

Referring to FIG. 23, teeth 246 of multi-piece drive sprocket 38, engage the plurality of bands 380. Bands 380 surround the barrel portions 170 of side bars 172, 174. When chain 40 is being moved, there is no direct frictional contact between side bars 172, 174 and multi-piece drive sprocket 38 because of high wearing band 380 disposed therebetween.

Preferably, band 380 is that it be made of stainless steel because of the high wear properties. However, other materials may be used. In a typical application, band 380 may have an inside diameter of 0.850 wide and an outside diameter of 0.012" thick. Band 380 may typically include three (3) coils. However, the number of coils may be more or less than three. The bearing material in some cases may comprise high wear plastic material.

Figure 16:
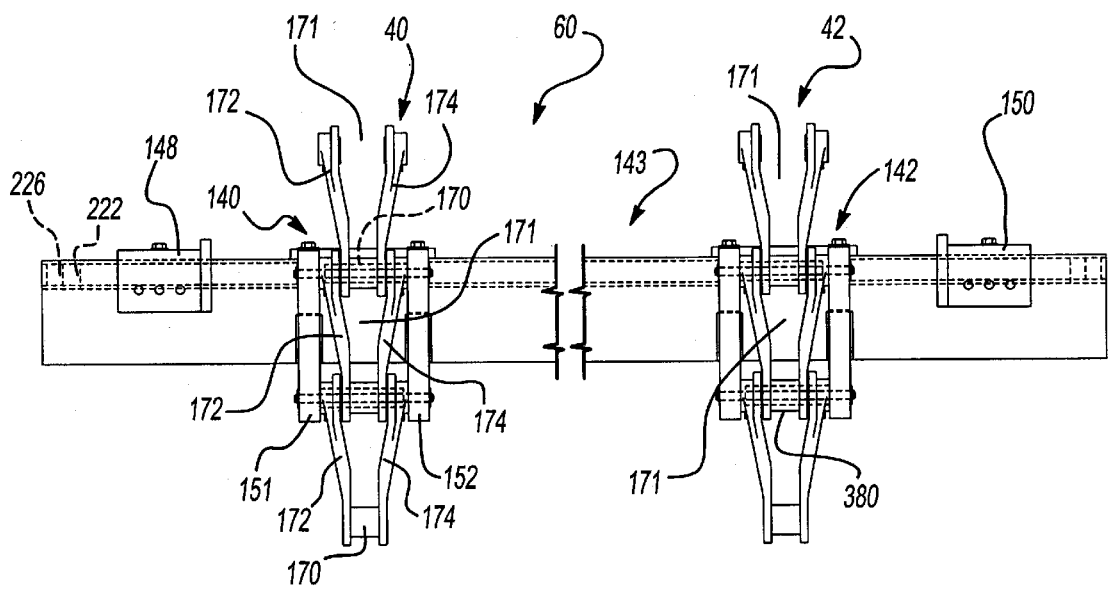
FIG. 16 is a bottom view of the sludge collector flight.
Figure 17:
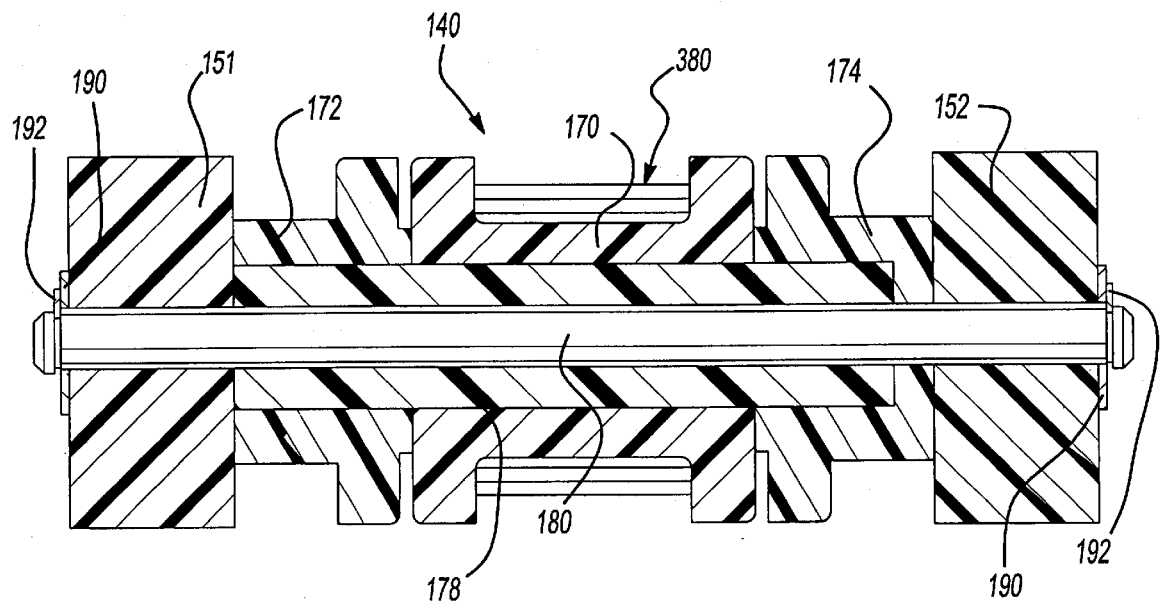
FIG. 17 is a cross sectional view, along line 17—17 of FIG. 15, of a flight attachment link.

FIG. 16 illustrates a bottom view of flight 60 as attached to portions of conveyor chains 40, 42. Non-metallic attachment assemblies 140, 142 are of identical design and will be described in detail with reference to attachment assembly 140. Referring to FIG. 17, a cross sectional view, along line 17—17 of FIG. 15, flight attachment assembly 140 includes a barrel portion 170, of link X in conveyor chain 42. Barrel portion 170 is disposed between side bars 172, 174 of an adjacent side bar link in conveyor chain 40. Side plates 151, 152 are located on opposite ends of side bars 172, 174 and are coupled thereto via a connecting pin 180. Non-metallic attachment assembly 140 includes a metallic bearing member 178 through which connecting pin 180 extends. A connecting pin 180 is securely coupled to side plate members 151, 152 with stainless steel washers 190 and stainless steel snap rings 192. Connecting pin 180 increases the tensile strength of attachment assembly 140 and allows conveyor chain 40 to withstand higher stress loads.

Figure 18:
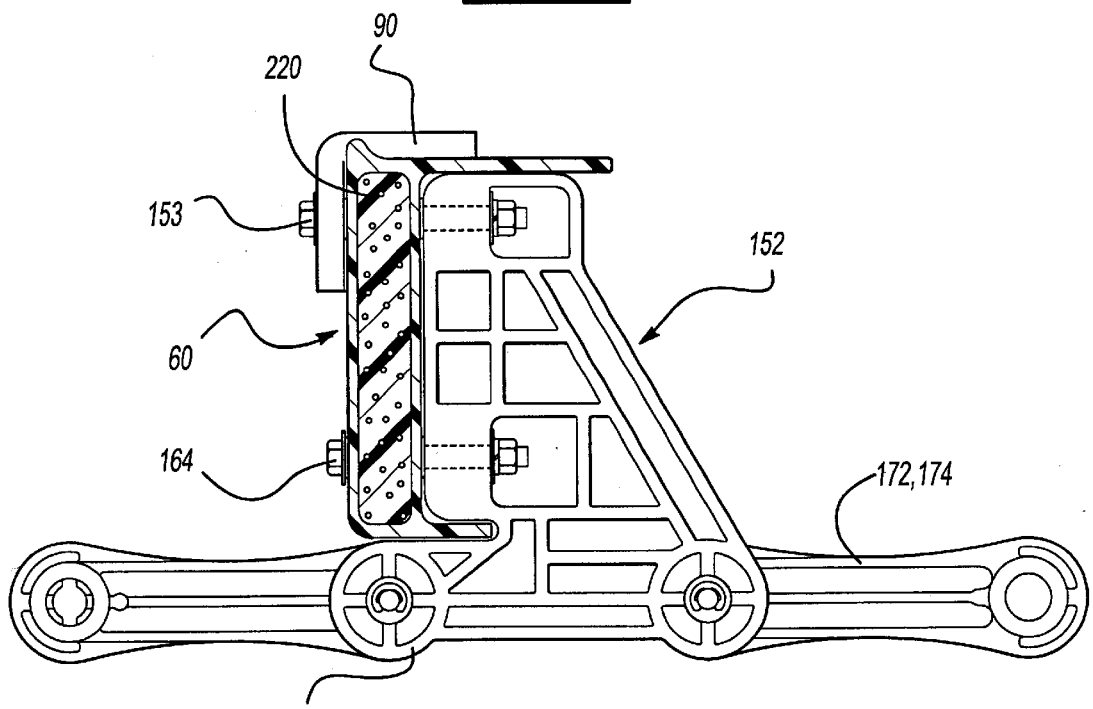
FIG. 18 is a side view, along line 18—18 of FIG. 15, of a section of a conveyor chain and attachment link assembly with the sludge collector flight.

With reference to FIG. 18, a side view, along line 18—18 of FIG. 15, illustrating the details of side plate member 152 is shown. Side plate member 152 includes an integral chain link portion 158 which is coupled to side bar portions 172, 174 of plastic conveyor chain 40. Stainless steel nut and bolt assemblies 153, 164 attach flight 60 to side plate member 152 and extend therethrough.

Figure 19:
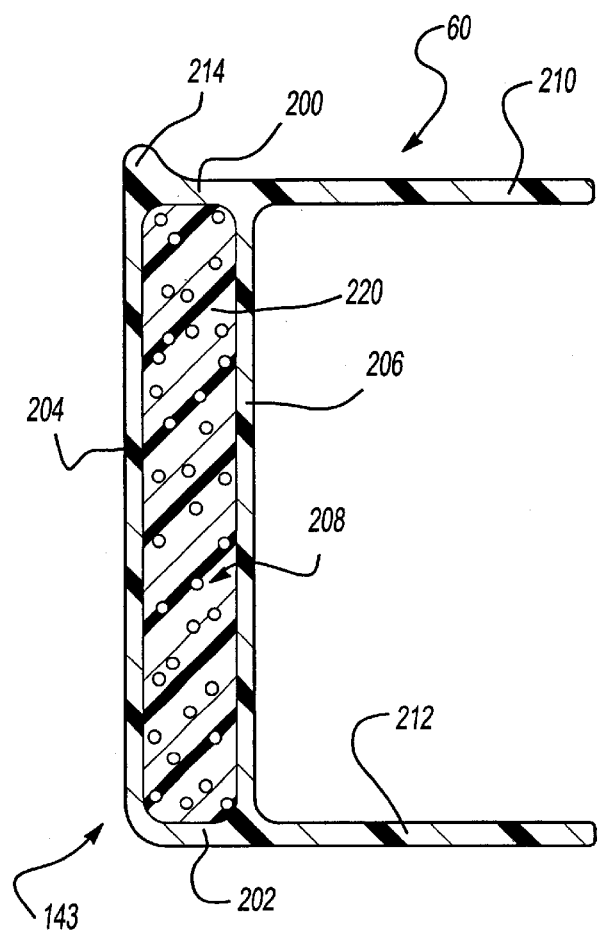
FIG. 19 is a cross sectional view along line 19—19 of FIG. 15 of the sludge collector flight.

With reference to FIG. 19, a view of flight 60, along line 19—19 of FIG. 15, is shown. As illustrated, main body portion 143 of flight 60 includes spaced top and bottom walls 200, 202 that connect spaced front and rear walls 204, 206. This defines a hollow, interior cavity 208. A pair of integrally molded parallel leg portions 210, 212 extend perpendicular from the top and bottom of rear wall 206. An integrally molded raised scraper lip 214 extends substantially along the entire length of main body portion 143 from a top wall 200. Preferably, flight 60 is made from a fiberglass reinforced plastic for maximum strength characteristics.

In order to increase the buoyancy of flight 60, a buoyant foam material 220, i.e. a material with a lower density than plastic, is disposed within interior cavity 208. The use of buoyant foam material 220 within interior cavity 208 increases the stiffness of flight 60 enabling the overall dimensions of main body portion 143 and leg portions 210, 212 to be maximized while minimizing the overall weight of flight 60 when submerged. Preferably, fight 60 has neutral buoyancy with a specific gravity of approximately one (1) when submerged in the waste water. As a result, flight 60 has increased stiffness and exhibits less center deflection for a given sludge load. Additionally, the increased stiffness and buoyancy of flight 60 allows the length of flight 60 to be increased without experiencing center deflection, which reduces the occurrence of failures within system 10. Another advantage of flight 60 is that its buoyancy when submerged creates less loads on the flight attachment links and other components of system 10.

Returning to FIG. 15, in accordance with a preferred embodiment, metallic plate members 222, are disposed within openings in opposite ends of interior cavity 208 of flight 60. Plug members 226, are also disposed in openings for substantially sealing interior cavity 208. The weight of plate members 222, may be varied in order to adjust the resulting buoyancy, i.e. the buoyant force acting on flight 60, for a particular application. One skilled in the art will readily recognize that plate member 222, and/or plug members 226, may be omitted from flight 60 for a particular application.

Figure 20:
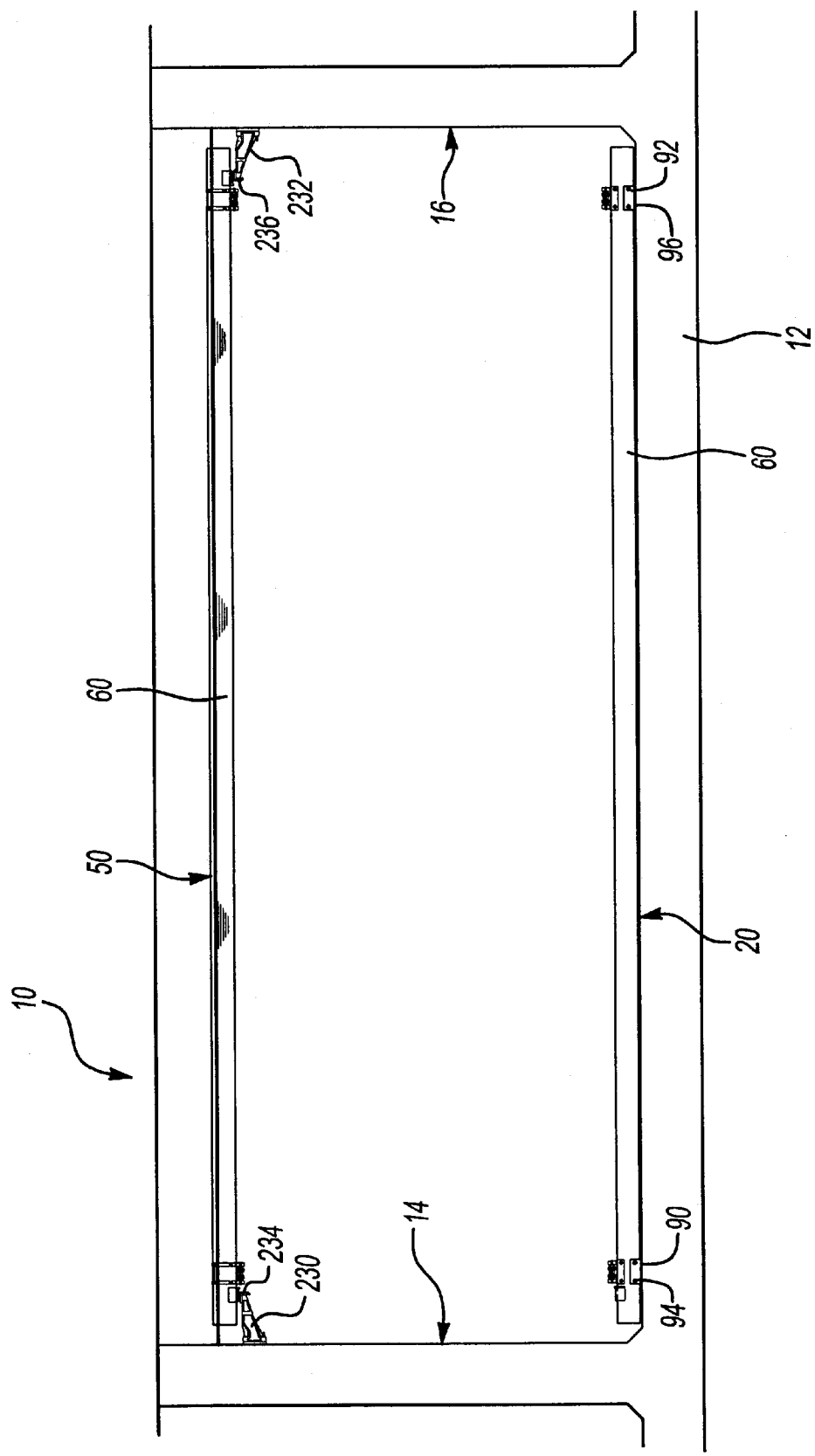
FIG. 20 is cross sectional view, along line 20—20 of FIG. 1, of the water clarifier tank and waste water treatment system.

Turning to FIG. 20, a view, along line 20—20 of FIG. 1, is shown. From this view, a pair of flights 60 are shown traveling about bottom surface 22 of tank 12, as well as partially above waste water level 50. Return rail wall bracket assemblies 230, 232 are mounted about side walls 14, 16 for supporting flights 60 as they skim the top of waste water level 50. Wear strip members 234, 236 are provided to reduce the wear between shoes 148, 150 and flights 60.

Compared to previous waste water treatment systems used in rectangular clarifying tanks, the system of the present invention operates with increased efficiently due to its lightweight, durability, and high immunity to corrosion. Additionally, the use of the non-metallic collector flights and non-metallic flight attachment assemblies in conjunction with the integrated dual sprocket assemblies and chain drive assembly improves the operation of the waste water treatment system. Greater tank width is also achievable by implementation of the composite drive shaft of the present invention, thus improving the overall applicability of the waste water treatment system.

The foregoing discloses and describes merely exemplary embodiments of the present invention. One skilled in the art will readily recognize from such discussion and from the accompanying drawings and claims, that various changes, modifications and variations can be made therein without departing from the spirit and scope of the present invention as defined by the following claims.

What is claimed is:

1. A water treatment system, comprising:
    a water treatment tank having opposing side walls;
    at least one water clarifier flight;
    first and second stub shafts;
    a drive shaft including:
        first and second end tubes;
        first, second and third drive sprockets;
        an interconnecting tube having a bore therethrough, mated with said first and second end tubes wherein said first and second end tubes each include a tube with a given outside diameter, said given outside diameter being less than a given inside diameter of said interconnecting tube such that said interconnecting tube receives a portion of said first and second end tubes and is secured thereto by a spacer ring, an interconnecting tube end cap, and an interlock key for each of said first and second end tubes for transferring rotational motion therebetween;
        said first and second stub shafts being rigidly connected to said side walls, said drive shaft being rotatably supported therebetween;
        said first and second drive sprockets being fixed to said first and second drive shaft end tubes, and each of said first and second drive sprockets being coupled to opposite ends of said at least one water clarifier flight for driving said at least one water clarifier flight;
        said third drive sprocket being fixed to either of said end tubes such that rotation of said third drive sprocket causes rotational motion of said drive shaft carrying said at least one water clarifier flight through said tank; and a motor for driving said third drive sprocket.

2. The water treatment system of claim 1, wherein said spacer ring and said tube end cap provides concentric alignment between said interconnecting tube and said first and second end tubes.

3. The water treatment system of claim 1, wherein said interlock key prohibits free rotational motion of said interconnecting tube relative to said first and second end tubes.

4. The water treatment system of claim 1, wherein said interconnecting tube is made from fiber reinforced plastic having biaxially wrapped glass fibers therein.

5. The drive shaft assembly of claim 1, wherein a portion of said bore is filled with buoyant foam material.

6. The water treatment system of claim 1, wherein first, second and third drive sprocket keys are disposed between each of said first, second and third drive sprockets and said first or second end tubes, respectively, such that said drive sprocket keys inhibit free rotational motion of said drive sprockets about said end tubes.

7. The water treatment system of claim 6, wherein said first and second end tubes and said first and second drive sprockets have a key slot for receiving first and second portions of said drive sprocket keys, respectively, therein.

8. The water treatment system of claim 1, wherein said first and second drive sprockets are of a multi-piece construction, further comprising:

a pair of half sprocket members having a pair of openings extending from a first face to a second face and located on opposite sides of an axis of rotation and a plurality of radially extending teeth; and a removable coupling means for rigidly attaching said pair of sprocket members about said first or second end tube assembly, thus forming said first or second drive sprocket.

9. The water treatment system of claim 1, wherein said coupling between said first and second drive sprockets and said opposite ends of said clarifier flight is achieved using first and second chains.

10. The water treatment system of claim 9, wherein said first and second chains further comprise:

a plurality of interconnected links each including a barrel shaped portion for frictionally contacting and driven by a mechanical drive member;

removable high wear strips of a width substantially equal to the axial length of said barrel shaped portions and performed into coiled bearing bands, adapted to be wrapped around and tightly engage said barrel shaped portions to form bearings on said plurality of interconnected links; and each of said coiled bands having free ends and including radially overlapping layers.

11. A drive shaft assembly for use in a water treatment system comprising a tank with opposing sidewalls having first and second stub shafts rigidly fixed thereto, said drive shaft assembly comprising:

first and second end tubes rotatably supported between said first and second stub shafts;

first and second drive sprockets fixed to each of said first and second end tube assemblies;

an interconnecting tube having a bore therethrough, concentric with, axially aligned between and fixed to said first and second end tubes wherein said first and second end tubes each include a tube with a given outside diameter, said given outside diameter being less than a given inside diameter of said interconnecting tube such that said interconnecting tube receives a portion of said first and second end tubes and is secured thereto by a spacer ring, an interconnecting tube end cap, and an interlock key for each of said first and second end tubes, said interconnecting tube transferring rotational motion between said first and second end tubes, wherein said interconnecting tube and said first and second end tubes define a drive shaft;

a third drive sprocket fixed along the length of said drive shaft, said third drive sprocket being driven by a motor, whereby rotational motion of said third drive sprocket causes rotational motion of said drive shaft assembly.

12. The water treatment system of claim 11, wherein said spacer ring and said tube end cap provide concentric alignment between said interconnecting tube and said first and second end tubes.

13. The water treatment system of claim 11, wherein said interlock key links said interconnecting tube to said first and second end tubes, such that said interconnecting tube is prohibited from free rotational motion relative to said first and second end tubes.

14. The water treatment system of claim 11, wherein said interconnecting tube is made from fiber reinforced plastic having biaxially wrapped glass fibers therein.

15. The drive shaft assembly of claim 11, wherein each of said first and second end tubes comprise an end tube having an integrated bearing.

16. The drive shaft assembly of claim 11, wherein said first, second and third drive sprockets are each secured from rotating about said end tube assembly by first, second and third drive sprocket keys disposed between each drive sprocket and said first and second end tubes.

17. The drive shaft assembly of claim 11, wherein a portion of said bore is filled with buoyant foam material.

18. The drive shaft assembly of claim 11, wherein said first and second drive sprockets are of a multi-piece construction, further comprising:

a pair of half sprocket members having a pair of openings extending from a first face to a second face and located on opposite sides of an axis of rotation and a plurality of radially extending teeth; and a removable coupling means for rigidly attaching said pair of sprocket members about said first or second end tube assemblies, thus forming said first or second drive sprockets.

19. A water treatment system comprising:

a tank;

a shaft assembly rotatably supported within said tank, said shaft assembly comprising:

a first tube having a bore;

a second tube at least partially disposed within said first tube;

a pair of spacers operably positioned between said first and second tubes for maintaining a predetermined relative position therebetween; and an interlock key operably securing said first tube to said second tube for fixed rotation therewith.

20. The water treatment system of claim 19, further comprising:

a third tube at least partially disposed within said first tube at an opposite end to said second tube;

a second pair of spacers operably positioned between said first and third tubes for maintaining a predetermined relative position therebetween;

a second interlock key operably securing said first tube to said third tube for fixed rotation therewith; and wherein said first tube transfers rotational motion between said second and third tubes.

21. The water treatment system of claim 19, further comprising a drive sprocket fixedly coupled to one of the group consisting of said first tube and said second tube.

22. The water treatment system of claim 21, wherein said drive sprocket comprises:

a pair of half sprocket members each having a pair of openings extending from a first face to a second face and located on opposite sides of an axis of rotation;

each of said pair of half sprockets having a plurality of radially extending teeth; and a removable coupling means for rigidly attaching said pair of sprocket members about one of said first or second tubes, thus forming said drive sprocket.

23. The water treatment system of claim 19, wherein said first tube is an interconnecting tube and said second tube is an end tube.

24. The water treatment system of claim 19, wherein said pair of spacers includes a spacer ring and an end cap.

* * * * *